United States Patent [19]

Chan

[11] Patent Number: 5,586,129

[45] Date of Patent: Dec. 17, 1996

[54] PARITY BIT MEMORY SIMULATOR

[75] Inventor: James Chan, Taipei, Taiwan

[73] Assignee: Brain Power Co., Taipei, Taiwan

[21] Appl. No.: 348,880

[22] Filed: Nov. 29, 1994

[51] Int. Cl.⁶ .................................................. G06F 11/10
[52] U.S. Cl. ................................. 371/51.1; 395/185.07
[58] Field of Search ................................. 371/49.1, 49.2, 371/51.1; 395/185.07

[56] References Cited

U.S. PATENT DOCUMENTS

| | | | |
|---|---|---|---|
| 5,095,485 | 3/1992 | Sato | 371/51.1 |
| 5,355,377 | 10/1994 | Venkidu et al. | 371/51.1 |
| 5,367,526 | 11/1994 | Kong | 371/51.1 |
| 5,446,873 | 8/1995 | Chan | 395/180 |

*Primary Examiner*—Stephen M. Baker
*Attorney, Agent, or Firm*—Bacon & Thomas

[57] ABSTRACT

A parity bit memory simulator including a parity bit memory formed of a single bit memory of fixed address length, which replaces the single bit parity RAM of variable address length of conventional memory modules, is connected with its address signal line to the data bus of the memory module so that the parity bit memory provides and stores parity bits for the computer system without changing the circuit layout of the data memory or caring about the capacity of the memory module. A voltage level detector and a refreshing operation detector can be installed in the parity bit memory to improve an error detecting function of a dynamic random access memory module in the parity bit system.

2 Claims, 1 Drawing Sheet

PARITY BIT MEMORY SIMULATOR

BACKGROUND OF THE INVENTION

The present invention relates to a parity bit memory simulator which uses a single bit memory of fixed address length as a parity bit memory to provide and store parity bits for the computer system and to improve the error detection function by means of the operation of its internal detector.

FIG. 1 shows the system block diagram of a conventional memory module, in which the address length of the data memory 10 is equal to that of the parity bit memory 20. Therefore, when the system 15 writes data in the data memory 10 through the data bus 11 or the data memory 10 outputs data to the data bus 11, the parity bit memory 20 simultaneously inputs or outputs the corresponding parity bit signal through the parity bit signal line 13. The signals transmitted by the parity bit signal line 13 and the data bus 11 are outputted or inputted according to the address assigned by the address bus 12 and the recognition control made by the read/write control signal line 14, to further read data out of or store data in the data memory 10 and the parity bit memory 20 respectively. As illustrated, this type of conventional memory module is comprised of a data memory 10 and a parity bit memory 20 of equal address length but different bit lengths. Therefore, this type of conventional memory module has only the function for the storage of parity bits for system recognition but does not have any error detecting ability. If there is any erroneous written in a specific address, the system can find such an error only when the data in the same address is fetched again. Therefore, this type of conventional memory module is less efficient in response to the writing of erroneous data.

SUMMARY OF THE INVENTION

The present invention has been accomplished under the circumstances in view. It is therefore the major object of the present invention to provide a parity bit memory simulator which provides and stores parity bits for the computer system and, which has the electrical and operational features of a variety of memories to improve the security and reliability of the memory system.

According to one aspect of the present invention, the data memory of the memory module is connected to the address bus, data bus and read/write control signal line, the parity bit memory of the memory module is connected to the read/write control signal line and the parity bit signal line, and the address pins of the parity bit memory are connected to the data bus. In a memory module made according to the aforesaid arrangement, during the data reading or writing process, the parity bit memory uses the data bus of the memory module as the address bus for the storing and outputting of parity bits. Therefore, no matter what the address of the address bus is, the output data bus signal of the data memory will be sent to the parity bit memory to read out the parity bit signal corresponding to that written by the system. Therefore, the parity bit memory has the function of providing and storing parity bits.

According to another aspect of the present invention, when the the data memory is a dynamic random access memory (DRAM), the parity bit memory can be installed with a voltage level detector and a refreshing operation detector. The voltage level of the voltage level detector can be set according to the specification of the DRAM. The refreshing operation detector is a logic circuit which detects the frequency of refreshing operations, to further detect possible errors during the storing process of the DRAM, i.e., the parity bit memory of the present invention can be equipped with detectors according to the electrical and operational features of the data memory. When the detectors detect an error, the parity bit memory will not produce a parity bit output signal according to the data bus signal, i.e, the parity bit memory will produce an error parity bit signal for immediate recognition by the system.

DETAILED DESCRIPTION OF THE PREFERRED EMBODIMENT

Figure 1:
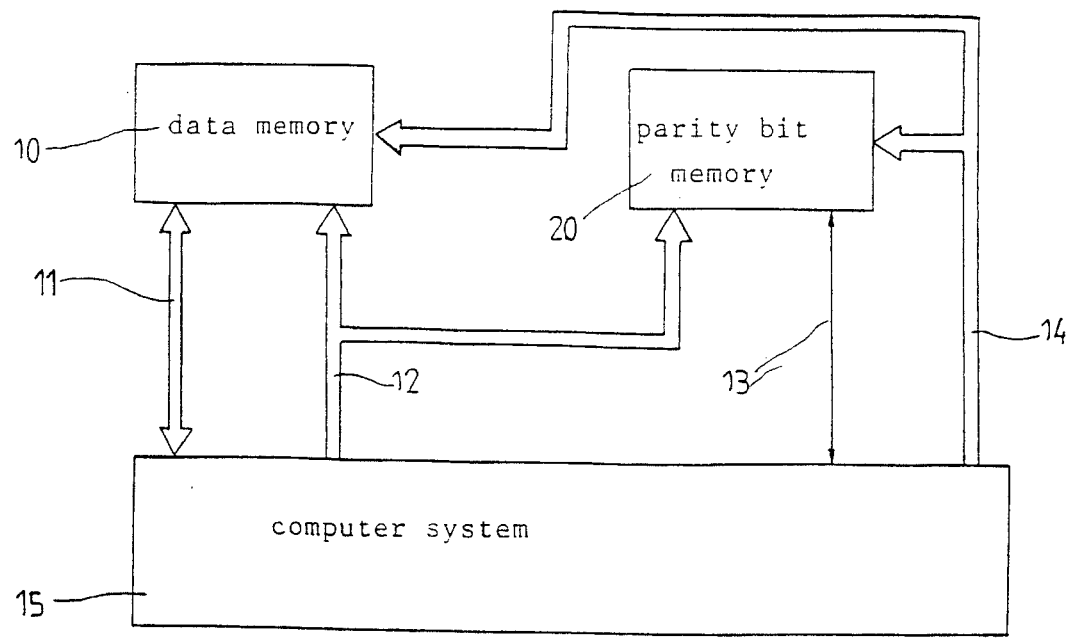
FIG. 1 shows the system block diagram of a memory module in intercommunication with a computer system according to the prior art.
Figure 2:
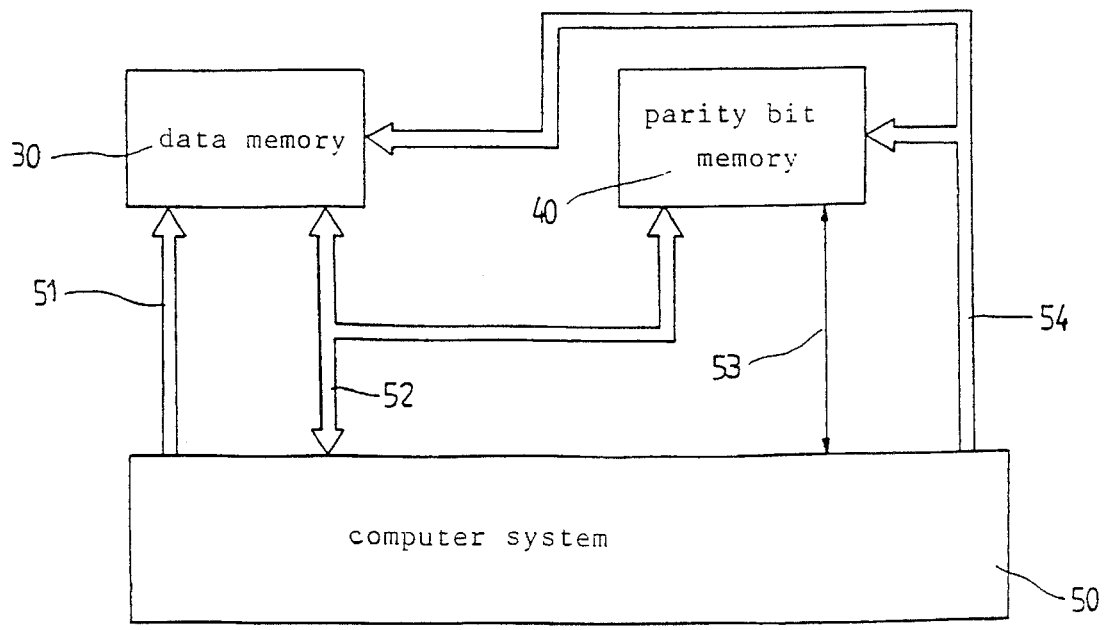
FIG. 2 is a circuit block diagram of the present invention.

Referring to FIG. 2, the parity bit memory, referenced by 40, and the data memory, referenced by 30, are arranged together to form a memory module. As illustrated, the data memory 30 is connected to the address bus 51, data bus 52 and read/write control signal line 54 of the computer system, referenced by 50. The parity bit memory 40 is comprised of a single bit memory of fixed address length connected to the system 50 by the read/write control signal line 54 and the parity bit signal line, referenced by 53. The address pins of the parity bit memory 40 is connected to the system 50 by the data bus 52. The system 50 transmits address signals to the data memory 30 through the address bus 51, and intercommunicates data with the data memory 30 through the data bus 52, and at the same time the parity bit memory 40 uses the signal from the data bus 52 as the address signal for the input, storing, and output of parity bits. Further, during the reading of the parity bit memory 40 when an address bus signal is produced, the parity bit memory 40 outputs or reads in a parity signal according to the signal of the data bus 52.

The number of signal lines of the address bus 51 is determined subject to the capacity of the memory module. The capacity of the data memory 30 will be relatively increased when the capacity of the memory module is increased. However, in the parity bit memory 40, the number of the address pins is equal to the bit width of the memory module, therefore the capacity of the parity bit memory 40 is fixed and cannot be increased with the increasing of the capacity of the memory module. For example, if the memory module is a 8-bit memory module, the data bus 52 has eight lines, and the parity bit memory 40 is fixed as a 256 bits single bit parity RAM, and therefore it fits any address length of the address bus 51.

The aforesaid data memory 30 can be a dynamic random access memory (DRAM); the parity bit memory 40 is a static random access memory free from refreshing operation.

A voltage level detector (not shown) and a refreshing operation detector (not shown) may be installed in the parity bit memory 40. The voltage level of the voltage level detector can be set according to the specification of the DRAM. The refreshing operation detector is a logic circuit which detects the frequency of refreshing operations through the read/write control signal line 54. Therefore, the parity bit memory 40 is enabled to detect identical or non-identical parity bits when an abnormality of voltage level or refreshing operation of the data memory 30 is detected.

Furthermore, during the process of reading data out of the memory module or writing data in the memory module, the parity bit memory 40 uses the data bus 52 as the address bus for the storing and outputting of parity bits. When the address bus 51, the data bus 52, or the parity bit signal line 53 is turned to the output mode, the signal on the address bus of the parity bit memory 40, i.e., the data bus 52, should be the same as that during the input mode presuming that there is no read/write error or storing error). Therefore, the parity bit memory 40 can store and provide parity bits for system recognition. Different from conventional memory modules in which the computer system accesses corresponding parity bits from the parity bit memory through the address bus, the present invention uses the data bus 52 to access parity bits from the parity bit memory. Therefore, the detecting speed of the present invention in finding out a data writing/reading error or storing error is greatly improved, and the system function of the computer system is secured.

While only one embodiment of the present invention has been shown and described, it will be understood that various modifications and changes could be made without departing from the spirit and scope of the invention.

What is claimed is:

1. A parity bit memory simulator comprising a parity bit memory and a data memory arranged into a memory module and connected to a computer system, wherein: the data memory is connected to an address bus, a data bus and a read/write control signal line of the computer system; the parity bit memory is connected to the read/write control signal line, the parity signal line and the data bus of the computer system; the computer system sends address signals to said data memory through the address bus and sends data to, or receives data from, said data memory through the data bus, and during the intercommunication of data between the computer system and said data memory, said parity bit memory uses the signal from said data bus as an address signal for the storing and outputting of parity bits such that during the reading of said parity bit memory when an address bus signal is produced, said parity bit memory outputs and reads in a parity signal according to the signal of the data bus.

2. The parity bit memory simulator of claim 1 wherein said parity bit memory is a single parity memory of fixed address length.

\* \* \* \* \*